(12) United States Patent
Kim et al.

(10) Patent No.: US 10,747,623 B2
(45) Date of Patent: Aug. 18, 2020

(54) MOBILE TERMINAL AND CONTROLLING METHOD THEREFOR

(71) Applicant: LG ELECTRONICS INC., Seoul (KR)

(72) Inventors: Minwoo Kim, Seoul (KR); Seungyup Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 585 days.

(21) Appl. No.: 15/533,495

(22) PCT Filed: Jan. 20, 2015

(86) PCT No.: PCT/KR2015/000580
§ 371 (c)(1),
(2) Date: Jun. 6, 2017

(87) PCT Pub. No.: WO2016/104861
PCT Pub. Date: Jun. 30, 2016

(65) Prior Publication Data
US 2017/0351580 A1 Dec. 7, 2017

(30) Foreign Application Priority Data
Dec. 24, 2014 (KR) .................. 10-2014-0188405

(51) Int. Cl.
*G06F 17/00* (2019.01)
*G06F 11/14* (2006.01)
*G06F 21/44* (2013.01)

(52) U.S. Cl.
CPC ...... *G06F 11/1456* (2013.01); *G06F 11/1451* (2013.01); *G06F 21/44* (2013.01); *G06F 2201/84* (2013.01)

(58) Field of Classification Search
CPC .. G06F 11/1456; G06F 11/1451; G06F 21/44; G06F 2201/84
See application file for complete search history.

(56) References Cited

U.S. PATENT DOCUMENTS

2006/0069711 A1* 3/2006 Tsunekawa ......... G06F 11/1464
709/200
2010/0077453 A1* 3/2010 Mohanty ............. G06F 11/1451
726/3
(Continued)

FOREIGN PATENT DOCUMENTS

KR 10-2012-0012211 A 2/2012
KR 10-2014-0098593 A 8/2014
(Continued)

*Primary Examiner* — Tyler J Torgrimson
(74) *Attorney, Agent, or Firm* — Birch, Stewart, Kolasch & Birch, LLP

(57) ABSTRACT

The present disclosure relates to a mobile terminal for performing a data backup function with an external device, and a controlling method therefore. The controlling method for the mobile terminal for performing a data backup function with an external device comprises the steps of: receiving authentication information of the external device when the external device is connected with an interface unit; identifying, using the received authentication information, whether the external device is a pre-registered device for performing the data backup function; and if the external device is the pre-registered device as a result of the identifying, transmitting at least a part of data stored in a memory to the external device.

15 Claims, 12 Drawing Sheets

(56) References Cited

U.S. PATENT DOCUMENTS

2013/0132347 A1* 5/2013 Chen .................. G06F 11/1456
707/648
2013/0326379 A1* 12/2013 Arrasvuori ............ G06F 3/0488
715/764
2014/0250324 A1 9/2014 Shih

FOREIGN PATENT DOCUMENTS

WO    WO 2012/050246 A1    4/2012
WO    WO-2012050246 A1 *    4/2012  ............. H04W 4/60

* cited by examiner

MOBILE TERMINAL AND CONTROLLING METHOD THEREFOR

CROSS REFERENCE TO RELATED APPLICATIONS

This application is the National Phase of PCT International Application No. PCT/KR2015/000580, filed on Jan. 20, 2015, which claims priority under 35 U.S.C. 119(a) to Patent Application No. 10-2014-0188405, filed in Republic of Korea on Dec. 24, 2014, all of which are hereby expressly incorporated by reference into the present application.

TECHNICAL FIELD

The present disclosure relates to a mobile terminal capable of executing a data backup function with an external device, and a method for controlling the same.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

In addition, with the increase in use frequency of a mobile terminal, an amount of data stored in the mobile terminal increases and important data is frequently stored in the mobile terminal. Accordingly, backup and restoration operations of the data stored in the mobile terminal are getting necessary in using the mobile terminal.

DISCLOSURE OF THE INVENTION

Therefore, an aspect of the detailed description is to provide a mobile terminal providing a data backup function, and a method for controlling the same.

Another aspect of the detailed description is to provide a mobile terminal capable of executing a data backup function with an external device, which is connected through an interface unit, and a method for controlling the same.

Another aspect of the detailed description is to provide a mobile terminal capable of enhancing user convenience in executing a data backup function, and a method for controlling the same.

To achieve these and other advantages and in accordance with the purpose of the present invention, as embodied and broadly described herein, there is provided a method for controlling a mobile terminal executing a data backup function with an external device, the method including receiving authentication information related to the external device when the external device is connected to an interface unit, identifying whether or not the external device is a pre-registered device for executing the data backup function, using the received authentication information, and transmitting at least part of data stored in a memory to the external device when the external device is identified as the pre-registered device.

In an embodiment disclosed herein, the authentication information may include product identification (PID) information related to the external device. The backup function may be executed when it is identified through the identifying step that the PID information related to the external device corresponds to PID information related to the pre-registered external device. The execution of the backup function may be restricted when the PID information related to the external device does not correspond to the PID information related to the pre-registered external device.

In an embodiment disclosed herein, the method may further include registering the external device as a device for executing the backup function with the mobile terminal, using the PID information related to the external device, based on a user selection, when the PID information related to the external device does not correspond to the PID information related to the pre-registered external device.

In an embodiment disclosed herein, the method may further include executing the backup function with the external device after the registering step, or when the external device is re-connected to the interface unit after the registering step is completed.

In an embodiment disclosed herein, screen information related to the data backup function may be output on a touch screen of the mobile terminal when the data backup function is executed. Graphic objects corresponding to each type of data may be included in the screen information. In the transmitting step to the external device, data of a type corresponding to a graphic object selected by a user from the graphic objects may be transmitted to the external device.

In an embodiment disclosed herein, screen information related to the backup function may include graphic objects corresponding to each type of data. In the step of transmitting the at least part of the data stored in the memory to the external device, data of a type corresponding to a graphic object selected by a user from the graphic objects may be transmitted to the external device.

In an embodiment disclosed herein, the touch screen of the mobile terminal may be divided into a first area including the graphic object and a second area separate from the first area. The selection of the graphic object may be made in response to the graphic object being moved to the second area by a drag touch applied to the graphic object.

In an embodiment disclosed herein, a log file for completely backed-up data among the data stored in the memory may be generated when the backup of the data stored in the memory is completed. Data to be transmitted to the external device may be decided using the log file when the backup function is executed again with the external device after the completion of the backup.

In an embodiment disclosed herein, screen information related to the backup function, output on a touch screen of the mobile terminal, may include graphic objects corresponding to each type of data. The touch screen may output thereon an indicator indicating a presence of data to be backed up, which is to be transmitted to the external device, in the vicinity of a graphic object corresponding to a type of the data to be backed up, on the basis of the log file.

In an embodiment disclosed herein, only data which has not been transmitted to the external device, among data of the type corresponding to the selected graphic object, may be transmitted to the external device based on the log file, when one of the graphic objects is selected.

In an embodiment disclosed herein, an application associated with the backup function may be activated on the mobile terminal, in response to the external device being connected to the interface unit. The application associated with the backup function may be multi-tasked with another application, which has been executed on the mobile terminal before the activation of the application associated with the backup function.

In an embodiment disclosed herein, the application associated with the backup function may be activated when the external device is connected in a state where screen information related to the another application is output on a touch screen of the mobile terminal. At least part of the screen information related to the another application may overlap a first graphic object notifying that the backup function is currently executed.

In an embodiment disclosed herein, the screen information related to the another application may be switched to screen information regarding the application associated with the backup function, when a preset type of touch is applied to the first graphic object.

In an embodiment disclosed herein, at least part of the screen information regarding the application associated with the backup function may overlap a second graphic object corresponding to the another application, in response to the screen information related to the another application being switched into the screen information regarding the application associated with the backup function.

In an embodiment disclosed herein, the screen information regarding the application associated with the backup function may be switched into the screen information related to the another application, when the preset type of touch is applied to the second graphic object.

In an embodiment disclosed herein, a graphic object notifying that the external device has been connected may be output when the external device is connected to the interface unit in a state where screen information related to the another application is output on the touch screen. The output of the screen information related to the another application may be maintained and the application associated with the backup function may be executed when a first type of touch is applied to the output graphic object. The application associated with the backup function may be executed when a second type of touch, different from the first type, is applied to the output graphic object, and the screen information related to the another application may be switched into the screen information regarding the application associated with the backup function.

In an embodiment disclosed herein, the data transmitted to the external device may be decided based on a type of the external device.

To achieve these and other advantages and in accordance with the purpose of the present invention, as embodied and broadly described herein, there is provided a mobile terminal, including a touch screen, an interface unit connected to an external device, a memory to store data therein, and a controller to execute a backup function for backing up the data stored in the memory, based on authentication information related to the external device connected to the interface unit. The controller may output screen information related to the backup function on the touch screen, in response to the backup function being executed, and transmit at least part of the data stored in the memory to the external device, using the interface unit.

In an embodiment disclosed herein, the controller may receive the authentication information from the external device through the interface unit when the external device is connected to the interface unit. The controller may identify whether or not the external device is a pre-registered device for executing the backup function, using the authentication information.

In an embodiment disclosed herein, the authentication information may include product identification (PID) information related to the external device. The controller may execute the backup function when the PID information related to the external device corresponds to PID information related to the pre-registered external device. The controller may restrict the execution of the backup function when the PID information related to the external device does not correspond to the PID information related to the pre-registered external device.

Advantageous Effect

The present invention can allow an execution of a data backup function only when an external device is connected to an interface unit and the connected external device is a pre-registered external device. That is, according to the present invention, whether or not the connected external device is an external device set by a user as a storage space for data to be backed up can be determined by using authentication information related to the external device. Therefore, according to the present invention, since the data backup function is executed only with respect to an authenticated external device, an information leakage to a third party can be prevented, and the user's privacy can be protected.

In addition, according to the present invention, even though the data backup function is not separately selected by the user, the data backup function can automatically be executed when a preset external device is connected. This may result in reducing the user's inconvenience in manipulating the terminal for selecting the data backup function.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Meanwhile, drawings illustrated in addition to this specification will be described from a left drawing in a clockwise direction. For example, in this specification, drawings may be referred to as first, second, third, fourth, . . . , nth drawings along arrows in a clockwise direction, starting from a left top drawing.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
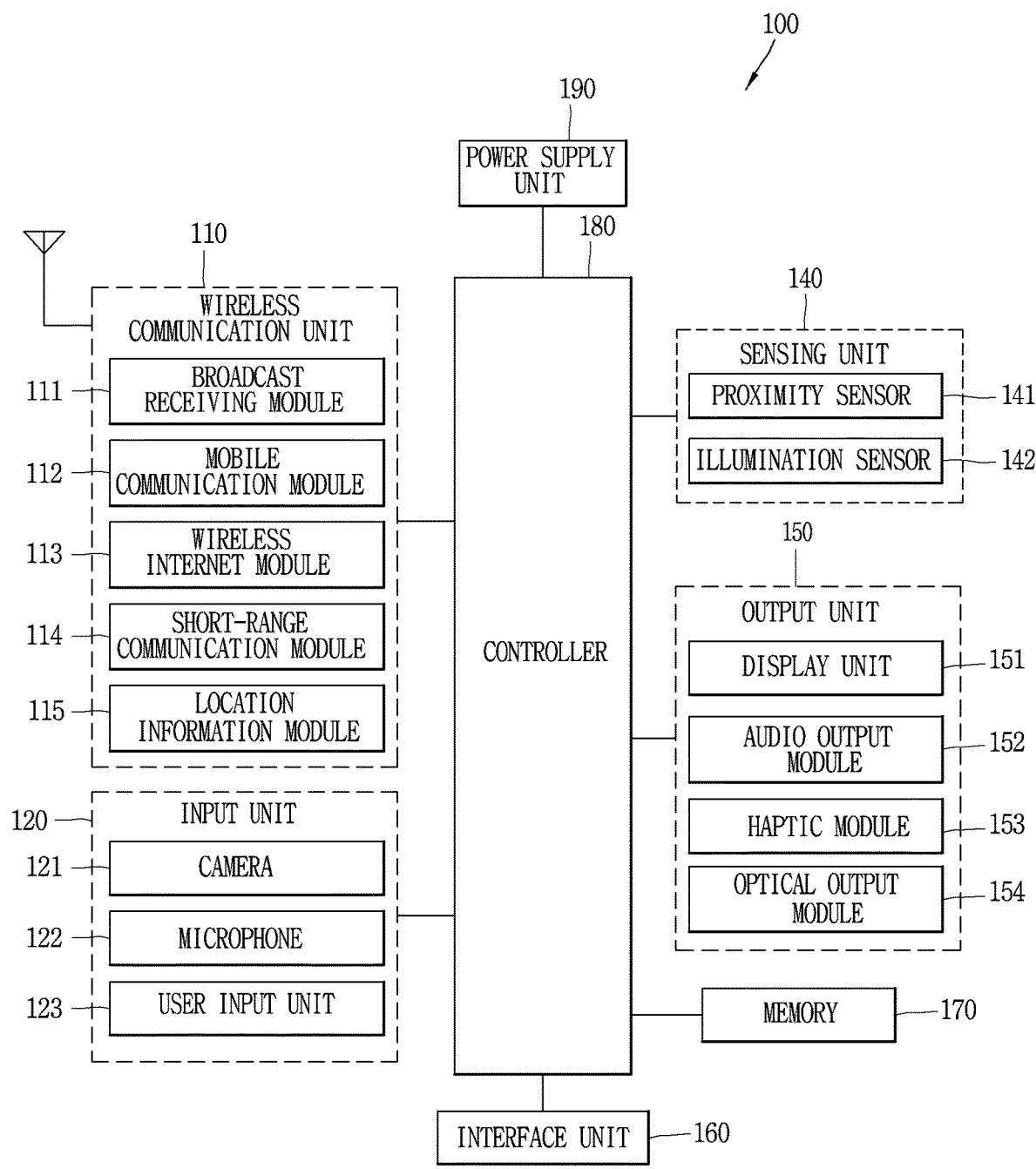
FIG. 1A is a block diagram of a mobile terminal in accordance with one exemplary embodiment of the present invention.
Figure 1B:
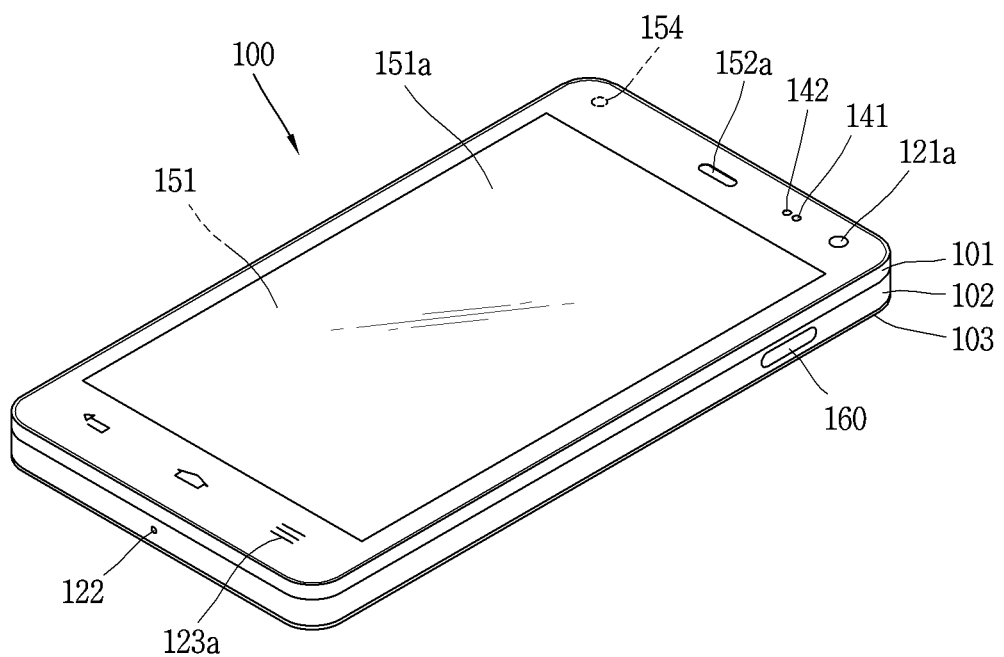
FIGS. 1B and 1C are conceptual views illustrating one example of a mobile terminal, viewed from different directions.
Figure 1C:
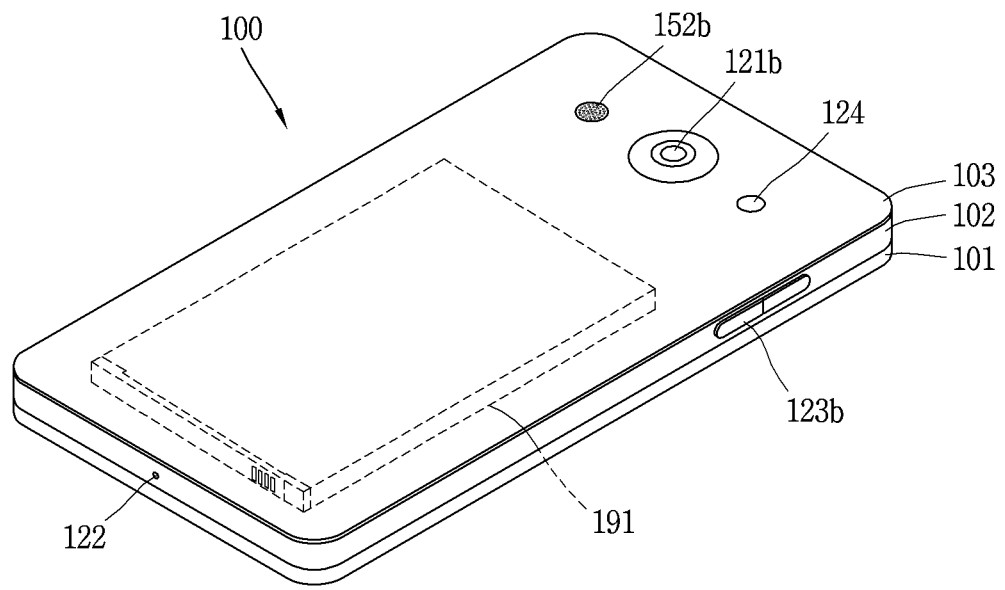

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

Meanwhile, the mobile terminal according to the present invention may be connected to an external device, and may transmit data stored therein to the connected external device. That is, the mobile terminal transmits the data stored therein to the connected external device so that the transmitted data is stored in the external device.

Here, the mobile terminal and the external device may be connected through the interface unit 160 or wirelessly connected as described above. The mobile terminal according to the present invention may be connected to an external device and perform a data backup function by which data stored in the mobile terminal is stored in the external device.

In the present invention, "that the mobile terminal 100 and the external device 200 are connected to each other" refers to that the mobile terminal 100 and the external device 200 are connected in a state allowing data transmission and reception between the mobile terminal 100 and the external device 200. That is, "that the mobile terminal 100 and the external device 200 are connected" means that the mobile terminal 100 and the external device 200 are in a state of performing communication with each other.

On the other hand, the external device may be any type as long as it is a device capable of playing a role of an external memory or an external hard disk drive (external hard disk).

On the other hand, the external device does not merely perform the memory function, but may have other inherent functions. The external device may be a mobile terminal.

Examples of the mobile terminal corresponding to the external device may include cellular phones, smart phones, personal digital assistants (PDAs), portable multimedia players (PMPs), navigators, slate PCs, tablet PCs, ultrabooks, wearable devices (e.g., a smart watch, a smart glass, a head mounted display (HMD), etc.), and the like.

Figure 2:
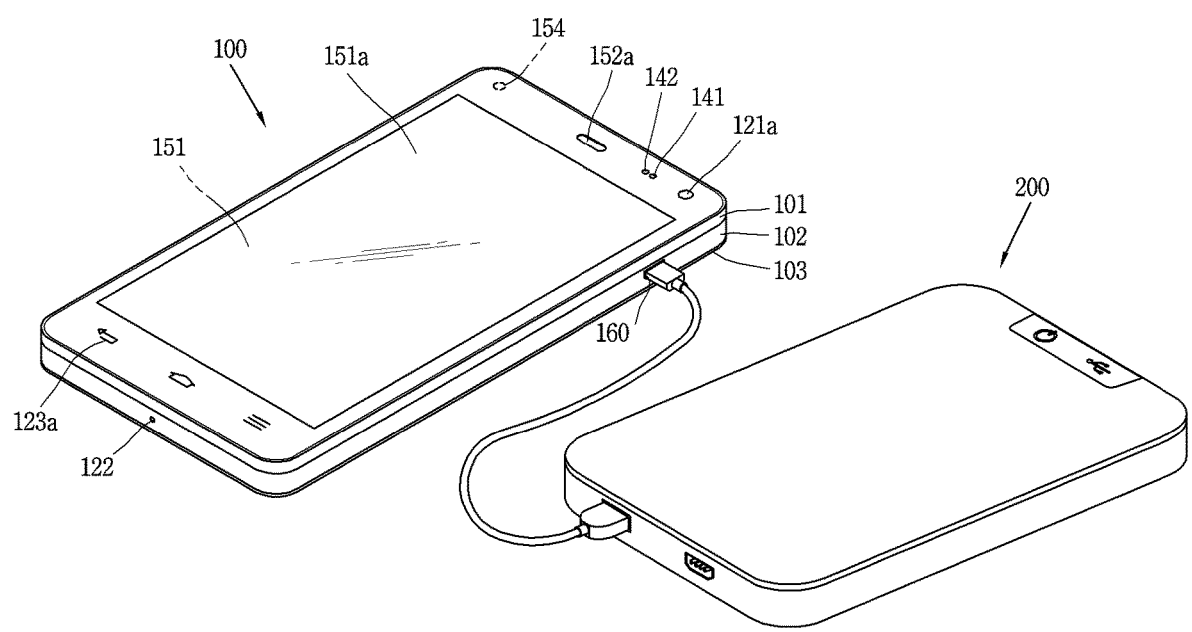
FIG. 2 is a conceptual view illustrating a method of connecting a mobile terminal and an external device to each other in accordance with the present invention.
Figure 3:
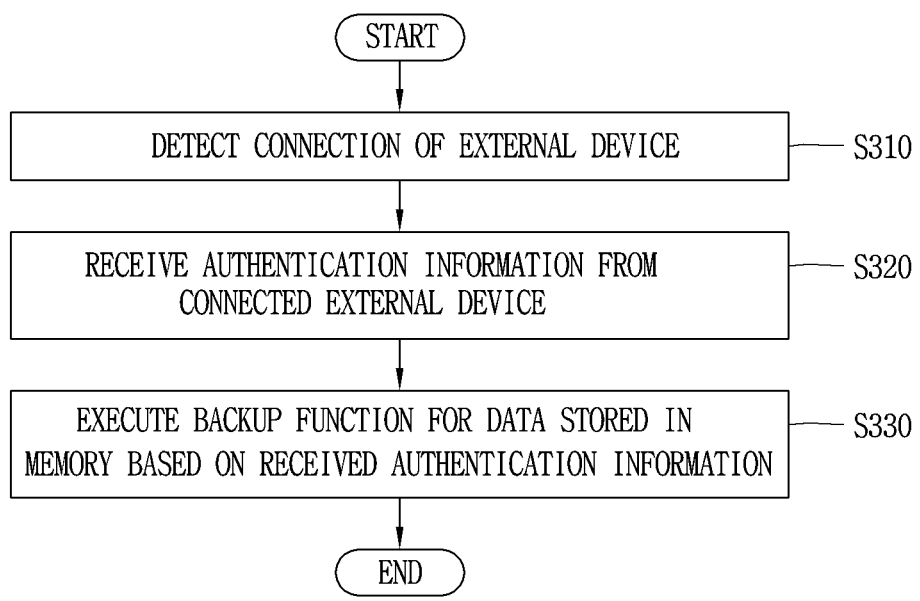
FIG. 3 is a flowchart illustrating a method of executing a data backup function with an external device connected to a mobile terminal in accordance with the present invention.

Hereinafter, description will be given in more detail of a mobile terminal providing a data backup function, and a method of providing the data backup function with respect to data stored in the mobile terminal through an external device in which backup data for the data stored in the mobile terminal is stored, with reference to the accompanying drawings. FIG. 2 is a conceptual view illustrating a connection method between a mobile terminal and an external device according to the present invention, and FIG. 3 is a flowchart illustrating a method of performing a data backup function with the external device connected to the mobile terminal according to the present invention.

As illustrated in FIG. 2, the mobile terminal 100 according to the present invention may be connected to an external device 200. Here, the external device 200, as aforementioned, may be a device which can perform a function of an external memory or an external hard disk drive (or external hard disk). The external device 200 may include at least one type of storage medium among a flash memory type, a hard disk type, a solid state disk (SSD) type, a silicon disk drive (SDD) type, a multimedia card micro type, a card type memory (e.g., SD or XD memory), random access memory (RAM), static random access memory (SRAM), read-only memory (ROM), electrically erasable programmable read-only memory (PROM), programmable read-only memory (PROM), a magnetic memory, a magnetic disk, and an optical disk.

The mobile terminal 100 and the external device 200 may be connected through any one of various connection methods, to perform data transmission and reception.

As an example, the mobile terminal 100 may be connected to the external device 200 in a wired manner through an interface unit 160. More specifically, the mobile terminal 100 may be connected to the external device through a universal serial bus on-the-go (USB OTG) method. The mobile terminal 100 may perform an appropriate control related to the connected external device, in response to the external device connected to the interface unit 160.

When the mobile terminal 100 and the external device 200 perform communication with each other through the USB OTG, the mobile terminal 100 and the external device 200 may perform high-speed communication and large-capacity communication.

As another example, the mobile terminal 100 may be connected to the external device 200 in a wireless manner through the wireless communication unit. The mobile terminal 100 may be connected to the external device 200 through short range communication using the short-range communication module 114 to transmit or receive data. As described above, the short-range communication module 114 is provided for short-range communication, and may support the short-range communication using at least one technology of Bluetooth™, Radio Frequency Identification (RFID), Infrared Data Association (IrDA)), Ultra Wideband (UWB), ZigBee, Near Field Communication (NFC), Wireless-Fidelity (Wi-Fi), Wi-Fi Direct, and Wireless Universal Serial Bus (Wireless USB). The short-range communication module may support wireless communication with the external device 200 through wireless area networks. The short-range wireless communication network may be a short-range wireless personal area network.

As such, the mobile terminal 100 can be connected to the external device 200 in the wired or wireless manner. Meanwhile, the mobile terminal 100 according to the present invention may receive authentication information (or identification information) from the external device 200 connected in the wired or wireless manner.

Here, the authentication information or the identification information of the external device 200 is inherent information possessed by the connected external device 200, and may be information for identifying the connected external device. The authentication information may include at least one of Product Identification (PID) information, Service Set Identifier (SSID) information, connection security method information, and password information.

In the mobile terminal 100, an external device in which data is to be backed up may be specified or registered in advance upon performing a backup function. That is, the controller 180 of the mobile terminal 100 may perform the backup function only with a pre-registered external device. The registration of the external device may be made based on a user selection or a user request. The controller 180 may be connected to the external device 200 in a wireless or wired manner, and perform a data backup function only when it is determined based on the authentication information related to the connected external device 200 that the connected external device 200 is a pre-registered external device. Thus, according to the present invention, since the data backup function is executed only for an authenticated external device, an information leakage to a third party can be prevented and the user's privacy can be protected.

On the other hand, the mobile terminal 100 according to the present invention may perform the backup function, in response to the pre-registered external device 200 being connected. This backup function may be performed through a backup function-associated application installed on the mobile terminal 100.

The backup function-associated application may be downloaded from an external server through wireless communication. Alternatively, the backup function-associated application may exist on the mobile terminal 100 from the time of shipment. The backup function-associated application may be stored in the memory 170, installed on the mobile terminal 100, and activated by the controller 180 to perform the backup function of the mobile terminal.

In addition, even when an unregistered external device is connected, the controller 180 may execute the backup function-associated application to register the unregistered external device.

Hereinafter, a method of performing the data backup function between the mobile terminal 100 and the external device 200 will be described in more detail based on the above description.

Referring to FIG. 3, the mobile terminal 100 according to the present invention detects a connection of the external device 200 (S310). Here, the external device 200 may be connected in a wired or wireless manner.

When the external device 200 is connected to the mobile terminal 100 in the wired manner, the external device 200 may be connected to the mobile terminal 100 through the interface unit 160 provided in the mobile terminal 100.

When the external device 200 is wirelessly connected to the mobile terminal 100, the external device 200 may be connected to the mobile terminal 100 through the wireless communication unit 110 provided in the mobile terminal 100, As an example, the mobile terminal 100 may be connected to the external device 200 in the wired manner through the interface unit 160. More specifically, the mobile terminal 100 may be connected to the external device through the universal serial bus on-the-go (USB OTG) method.

In this case, a communication terminal of the external device 200 may be connected to an external charger port of the mobile terminal 100, a wired data port, a memory card port, and a port for connecting a device provided with an identification module. The mobile terminal 100 may perform an appropriate control related to the connected external device, in response to the external device being connected to the interface unit 160.

As described above, the mobile terminal 100 may be connected to the external device 200 in the wired or wireless manner. Meanwhile, when it is detected that the external device 200 is connected, the mobile terminal 100 according to the present invention receives the authentication information related to the external device 200 from the external device 200 (S320). As described above, the authentication information (or the identification information) related to the external device 200 may be inherent information related to the connected external device 200 for identifying the connected external device. The authentication information may include at least one of PID information, SSID information, connection security method information, and password information.

When the mobile terminal 100 is connected to the external device 200, the authentication information may be received from the external device 200 even without a request from the mobile terminal 100.

On the other hand, when the mobile terminal 100 is connected to the external device 200, the controller 180 of the mobile terminal 100 may request the external device 200 to transmit the authentication information, and receive the authentication information from the external device 200 in response to the request.

When the authentication information is received, the mobile terminal 100 performs a backup function for data stored in the memory 170 based on the received authentication information (S330).

The controller 180 may transmit at least part of the data stored in the memory 170 in a wired or wireless manner to the external device 200 so that the at least part of the data is stored in the external device 200.

The controller 180 may transmit all or part of the data stored in the memory 170 to the external device 200. Data to be backed up in the external device 200 among the data stored in the memory 170 may be decided based on a user selection or under the control of the controller 180.

The controller 180 may decide data to be backed up among the data stored in the memory 170, on the basis of various criteria, such as a type of an external device, a type (or format) of data, an application associated with data, a generated date of data, a saved (stored) date of data, a changed (or modified) date of data, whether or not data is prestored in the external device 200, and the like.

On the other hand, the backup function may be provided through an application associated with the backup function. In addition, when the backup function is performed, screen information related to the backup function or an execution screen of the application associated with the backup function may be output on the display unit (or the touch screen) 151.

Meanwhile, when the authentication information is received from the external device 200 and the external device 200 corresponding to the received authentication information is not a pre-registered external device, which is permitted to perform the backup function with the mobile terminal 100, the controller 180 may restrict the execution of the backup function.

For example, the controller 180 may execute the backup function when the PID information (SSID information, connection security method information or password information) related to the external device included in the authentication information received from the connected external device 200 corresponds to PID information related to a pre-registered external device.

On the other hand, the controller may restrict the execution of the backup function when the PID information (SSID information, connection security method information or password information) related to the external device does not correspond to the PID information related to the pre-registered external device.

In this case, the controller 180 may not transmit the data stored in the memory 170 to the external device 200. Also, the controller 180 may not activate the application associated with the backup function.

Meanwhile, when the PID information (or the SSID information) related to the external device 200 does not correspond to the authentication information related to the pre-registered external device, the controller 180 may register the external device 200 as a device for executing the backup function with the mobile terminal, using the PID information (or SSID information) related to the external device 200, on the basis of a user selection.

As such, after the device registration is completed, when the external device 200 is reconnected to the mobile terminal 100, the external device 200 and the mobile terminal can perform the backup function.

As described above, according to the present invention, the data backup function can be executed only when the external device is connected to the interface unit and the connected external device is a pre-registered external device. That is, according to the present invention, it can be determined, using the authentication information related to the external device, whether or not the connected external device is an external device which the user has set as a storage space of data to be backed up. Therefore, according to the present invention, since the data backup function is executed only for the authenticated external device, information leakage to a third party can be prevented and the user's privacy can be protected.

Hereinafter, detailed embodiments for performing the backup function will be described in more detail with reference to the accompanying drawings. FIGS. 4, 5, 6, and 7 are conceptual views each illustrating screen information related to the function for backing up data.

Figure 4:
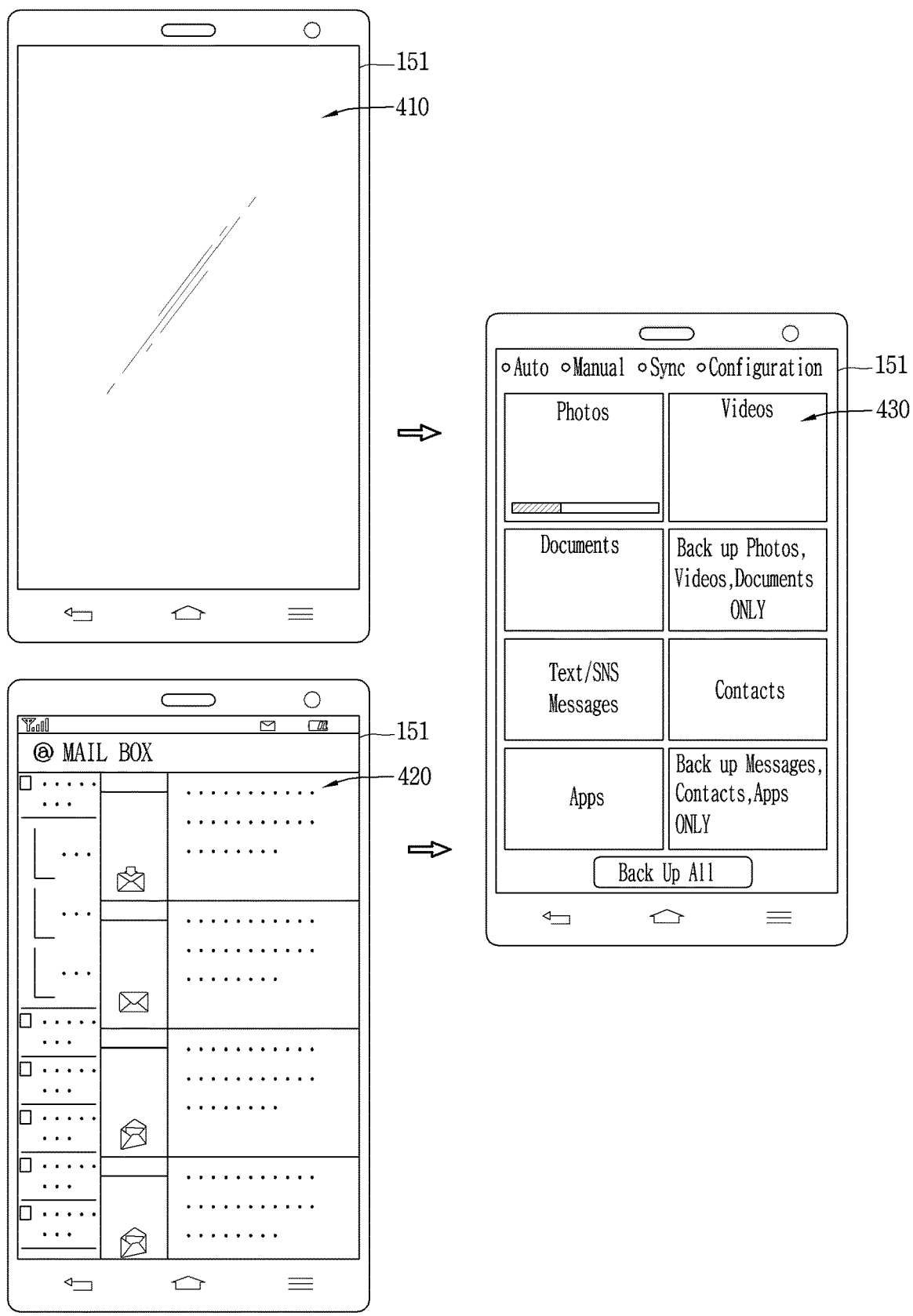
FIGS. 4, 5, 6 and 7 are conceptual views each illustrating screen information related to a data backup function.

In the mobile terminal according to the present invention, when it is determined based on the authentication information related to the connected external device that the connected external device is an external device capable of performing the backup function or a pre-registered external device, namely, when the authentication process for the connected external device is completed, screen information related to the backup function may be output on the touch screen 151. The controller 180, as illustrated in FIG. 4, may activate the touch screen 151 when the connected external device is authenticated in a deactivated state of the touch screen 151 (see reference numeral 410 in FIG. 4), and then output screen information 430 related to the backup function on the touch screen 151. When the touch screen 151 is in an activated state and screen information 420 related to an arbitrary application is displayed in the activated state of the touch screen 151, the controller 180 may switch the screen information 420 related to the arbitrary application into screen information 430 related to the backup function.

Here, the screen information 430 related to the backup function may include information regarding a process of performing the backup function, information for selecting data to be backed up through the backup function, and the like.

For example, the screen information 430 may include graphic objects corresponding to types of data, respectively. For example, the screen information 430 may include graphic objects corresponding to photos, videos, documents, text/SMS messages, contacts, and applications. Here, the type of the data may be any other type of data, in addition to those examples, if it can be stored in the mobile terminal.

Further, the screen information 430 may include icons for performing the backup function. Each of the icons may be associated with a control command for backing up a specific type of data or a control command for backing up all data to be backed up.

Meanwhile, when one of the graphic objects included in the screen information 430 is selected, the controller 180 may perform a backup for a type of data corresponding to the selected graphic object.

For example, when a graphic object corresponding to photo data (for example, a graphic object named "photos" in the drawing) is selected, the controller 180 transmits data corresponding to the photo, among the data stored in the mobile terminal, to the external device.

On the other hand, when the backup function for all data is selected in the screen information 430 (for example, when a graphic object named "back up all" in the drawing is selected), the controller 180 may transmit all data to be backed up, among the data stored in the memory 170, to the external device 200. Meanwhile, the screen information related to the backup function may be variously configured, in addition to the examples described in this specification.

Meanwhile, when the data backup to the external device 200 is completed or while the data stored in the mobile terminal 100 is backed up, the controller 180 of the mobile terminal 100 according to the present invention may generate a log file for each data backed up and transmitted (or stored) in the external device 200, among those data stored in the mobile terminal 100.

The controller 180 may decide data to be backed up (backup target data), among those data stored in the mobile terminal 100, using the log file, when the backup for the data stored in the mobile terminal 100 is executed again.

More specifically, the log file may be stored in the memory 170, and the backup target data may be filtered based on the log file when the backup with respect to the mobile terminal 100 is to be performed again. That is, the controller 180 may skip the backup for data which has completely been backed up, using the log file.

That is, the controller 180 may back up data which has not been stored in the external device or has not been transmitted to the external device, among those data stored in the mobile terminal 100, using the log file.

More specifically, the controller 180 may compare information stored in the log file with the data stored in the mobile terminal 100. The controller 180 may determine whether there is data to be backed up among the data stored in the mobile terminal 100 using the log file. When it is determined that the data to be backed up is included in the data stored in the mobile terminal 100, the controller 180 may perform the data backup.

The log information (or the log file) may include log information related to the backed-up data and identification information related to the external device. Accordingly, when the authentication information related to the external device 200 performing the backup matches the identification information related to the external device stored in the log information, the controller 180 may perform the backup function for the data stored in the mobile terminal 100 using the corresponding log information.

On the other hand, when different types of data are completely backed up using the log information, the controller 180 may update the log information to include a log of data that has been backed up so far.

Meanwhile, when the backup target data exists as a result of the comparison, the controller 180 may output notification information indicating that the backup target data exists.

Figure 5:
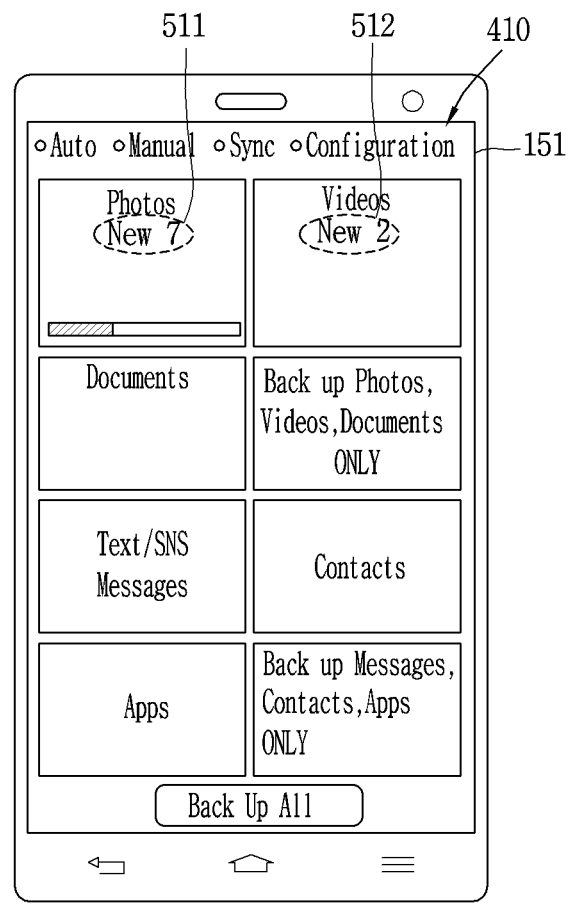

For example, the notification information may be output in various ways. For example, as illustrated in FIG. 5, indicators 511 and 512 may be output on graphic objects corresponding to data types in which backup target data exists.

As described above, screen information 410 related to the backup function may include graphic objects corresponding to each type of data, and the controller 180 may output the indicators 511 and 512, indicating the presence of the backup target data, in the vicinity of the graphic objects corresponding to each type of backup target data to be transmitted to the external device, on the basis of the log file.

Furthermore, the notification information may be output using at least one of auditory, tactile, and visual manners.

Meanwhile, the visual manner may correspond to turning on or off a lighting device (or LED lamp) provided in the mobile terminal 100. The controller 180 may output a current backup state of the mobile terminal 100 by controlling a color of the lighting device differently.

Furthermore, when a backup request is received from the user in response to the output of the notification information indicating the presence of the backup target data, the controller 180 may perform the backup for the backup target data.

That is, according to the present invention, even though an external device is connected, the data backup function may not be unconditionally activated but may be activated after a permission command for the data backup is received from the user.

Meanwhile, the mobile terminal according to the present invention may provide a user interface by which the user can more intuitively select data to back up. For example, as illustrated in a first drawing of FIG. 6, the touch screen 151 may be divided into a plurality of areas 720 and 730. Graphic objects corresponding to data to be backed up (backup target data) may be included in the first area 720. Graphic objects corresponding to each type of data or graphic objects corresponding to a specific type of data (for example, graphic objects corresponding to photos), as illustrated, may be included in the first area 710. The graphic objects included in the first area 710 may be decided based on a user selection.

The second area 730 may be utilized as an area for moving a graphic object corresponding to the backup target data.

Figure 6:
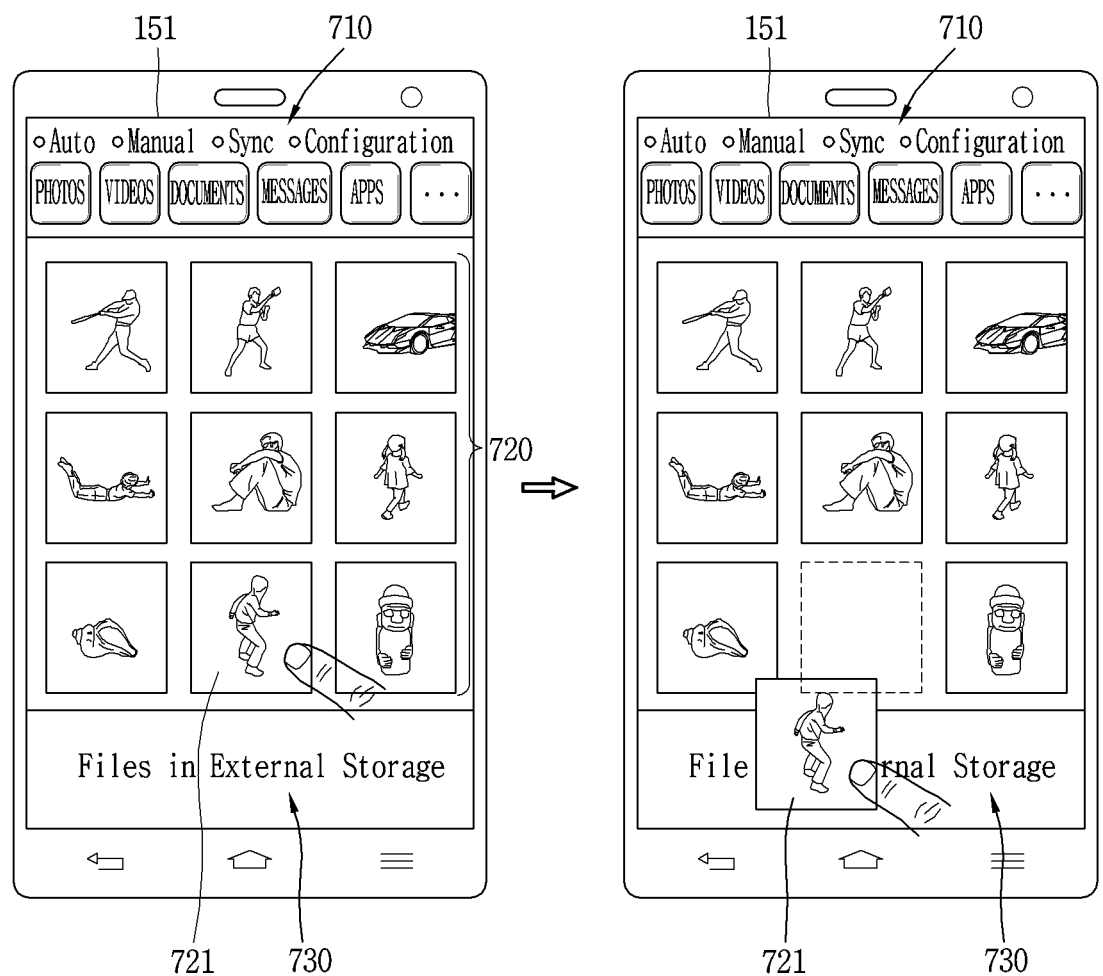

As such, in the divided state of the touch screen 151 into the plurality of areas, when at least one 721 of the graphic objects included in the first area 710 is moved to the second area 720, as illustrated in a second drawing of FIG. 6, the controller 180 may transmit data corresponding to the moved graphic object 721 to the external device 200. The method of moving the data to the second area 730 may be various and the data may be moved based on a touch applied to the graphic object. For example, the selection for the graphic object may be made based on the graphic object being moved to the second area by a drag touch applied to the graphic object.

According to the present invention, in the state where the graphic objects are included in the first area 720, the controller 180 may transmit data corresponding to all of the graphic objects included in the first area 720 or all data corresponding to a specific data type to the external device 200, according to a user request.

Figure 7:
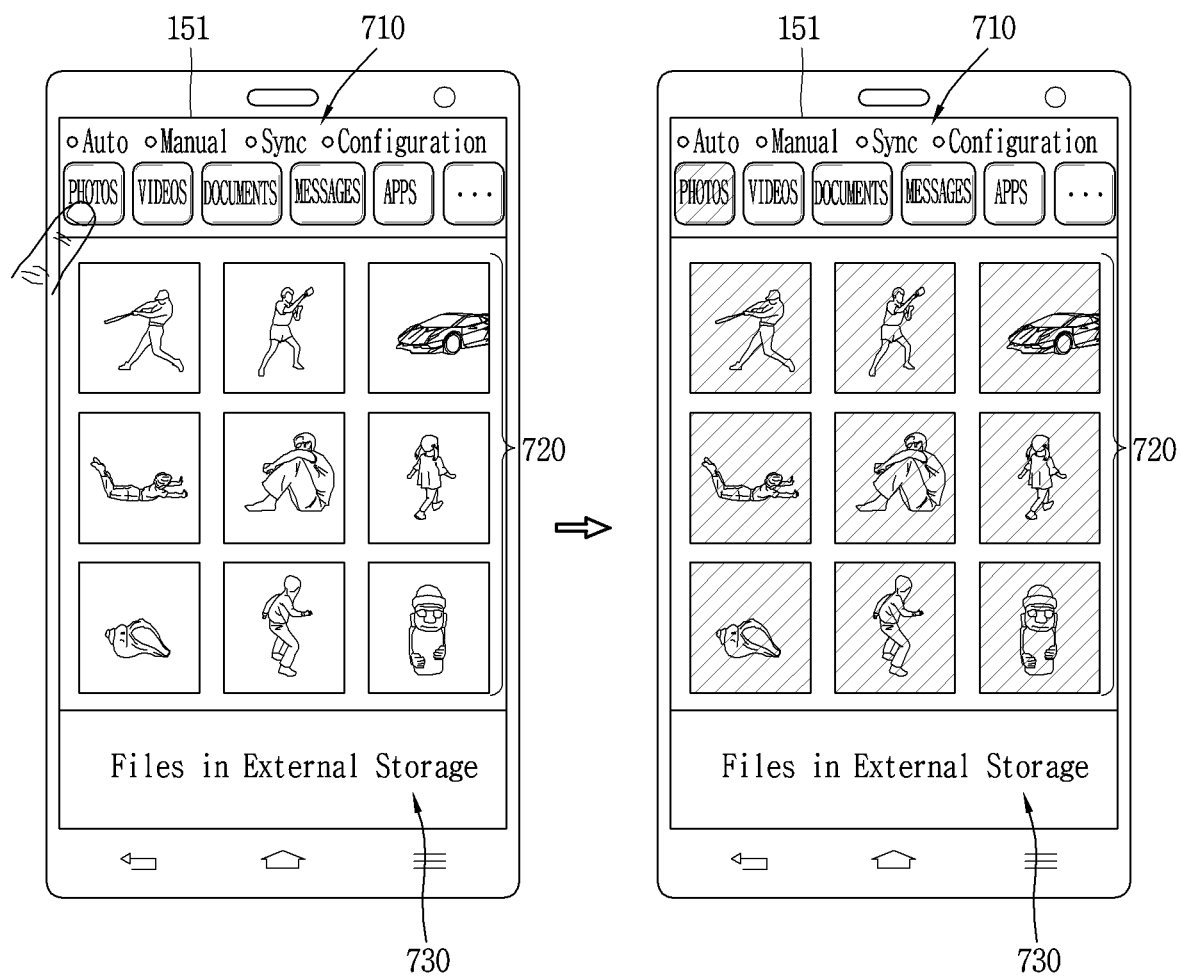

For example, as illustrated in a first drawing of FIG. 7, when a preset touch is applied to a graphic object corresponding to a specific data type (for example, a graphic object corresponding to "photo"), the controller 180 may transmit to the external device 200 data corresponding to the graphic object to which the preset touch has been applied.

In this instance, as illustrated in a second drawing of FIG. 7, the controller 180 may select the graphic object corresponding to the specific data type and provide an image effect (or a 'photoshop' effect) to graphic objects corresponding to each data corresponding to the selected graphic object, to visually inform that each data corresponding to the graphic object is backed up. In addition, the controller 180 may output a notification image to overlap each of the graphic objects corresponding to the data corresponding to the selected graphic object, or output the notification image in the vicinity of each of the graphic objects corresponding to the data corresponding to the selected graphic object. In this way, the user can easily recognize what the data to be backed up is.

In addition, although not illustrated, the controller 180 may select all of the graphic objects included in the first area 710 when a preset touch (e.g., a long touch) is applied to a graphic object included in the first area 720. And when a drag touch is applied after the graphic object is selected, the graphic objects included in the first area 710 may be moved along the drag touch.

When at least part of the selected graphic objects is moved to the second area 730 along the drag touch, the data corresponding to the selected graphic object may be transmitted to the external device 200.

As described above, the mobile terminal according to the present invention can provide a user environment in which the user can more intuitively select the backup target data.

Figure 8A:
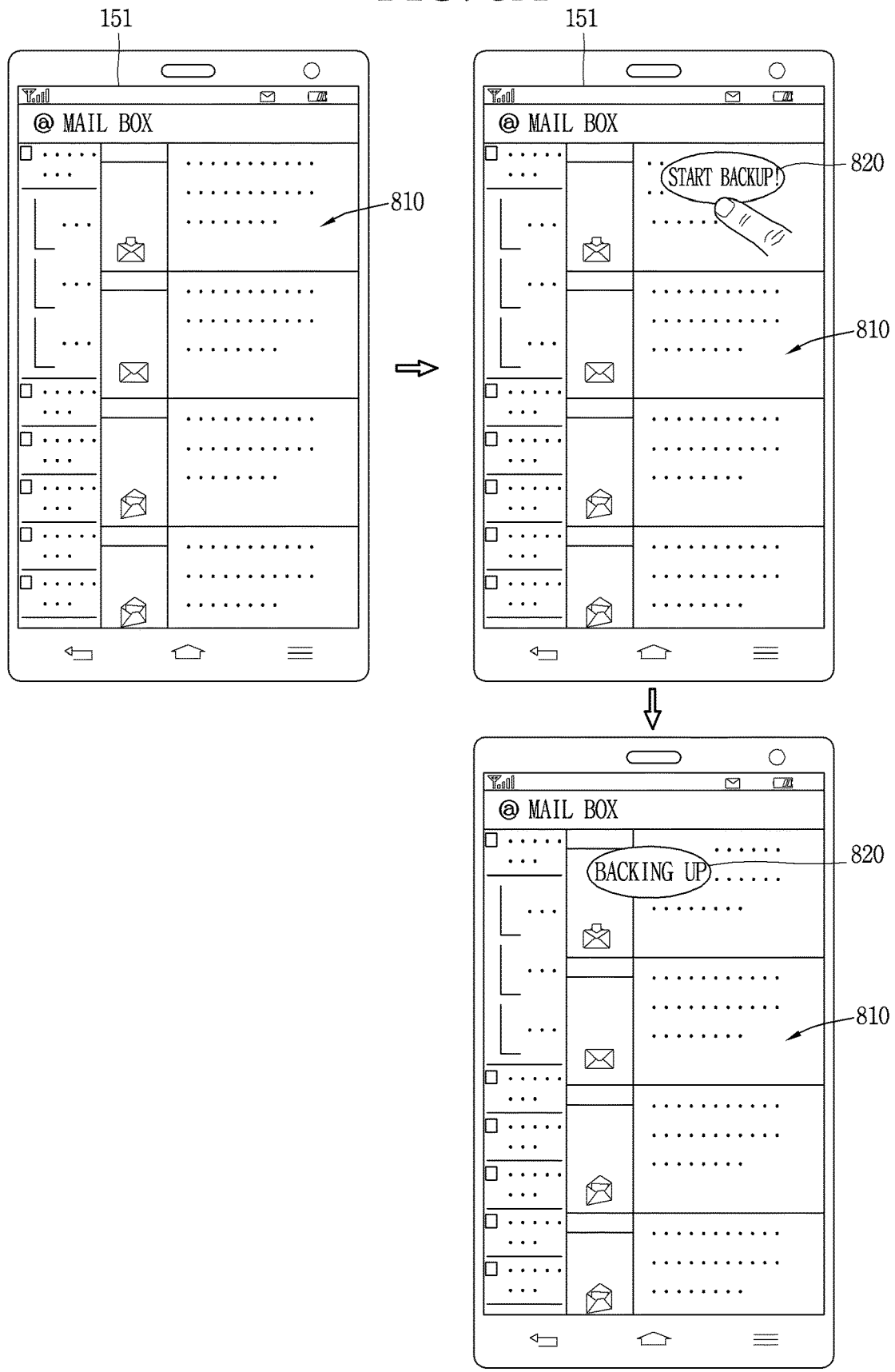
FIGS. 8A, 8B and 8C are conceptual views illustrating a relationship between a data backup function and other functions of a mobile terminal in accordance with the present invention.
Figure 8B:
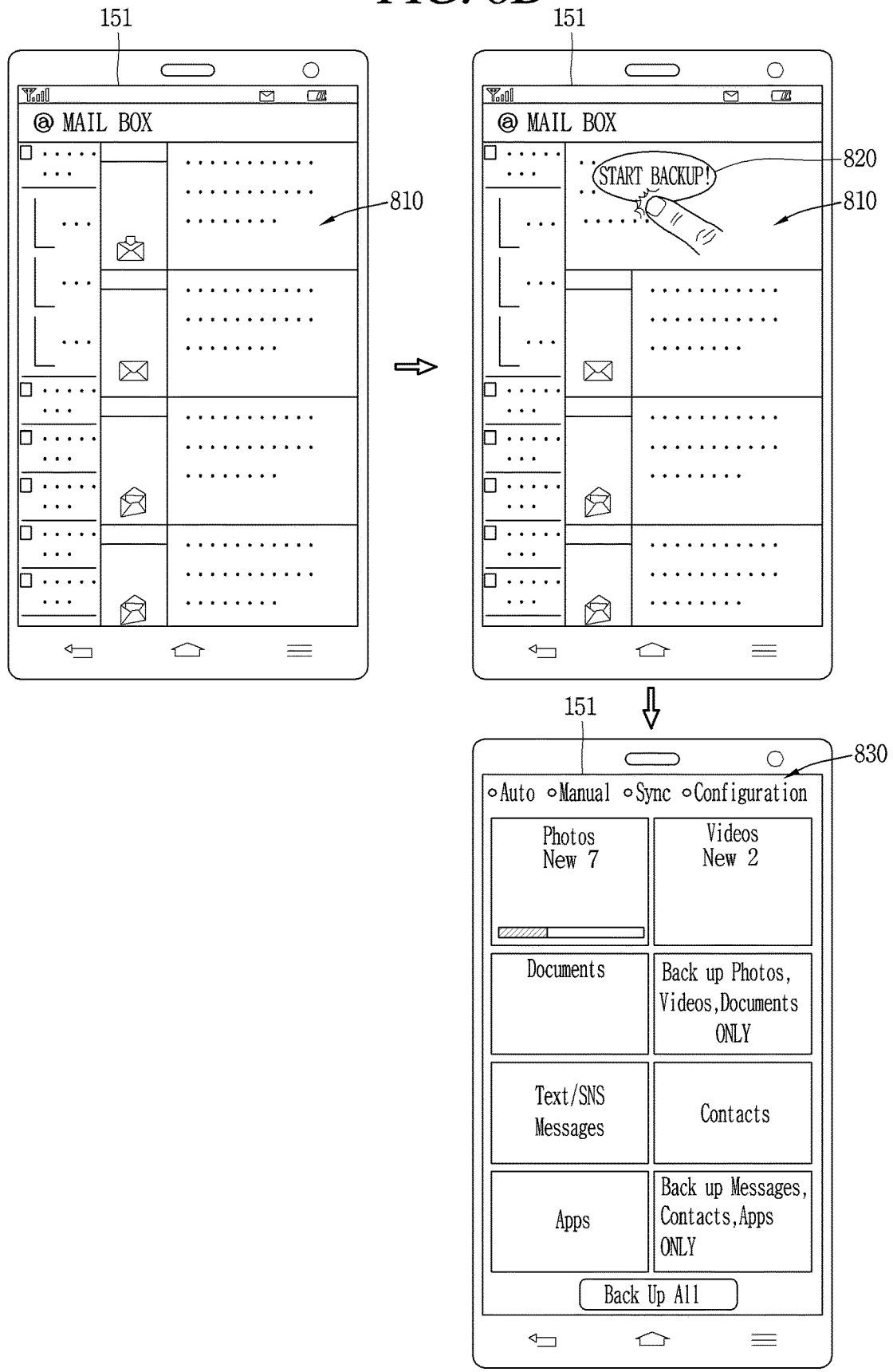
Figure 8C:
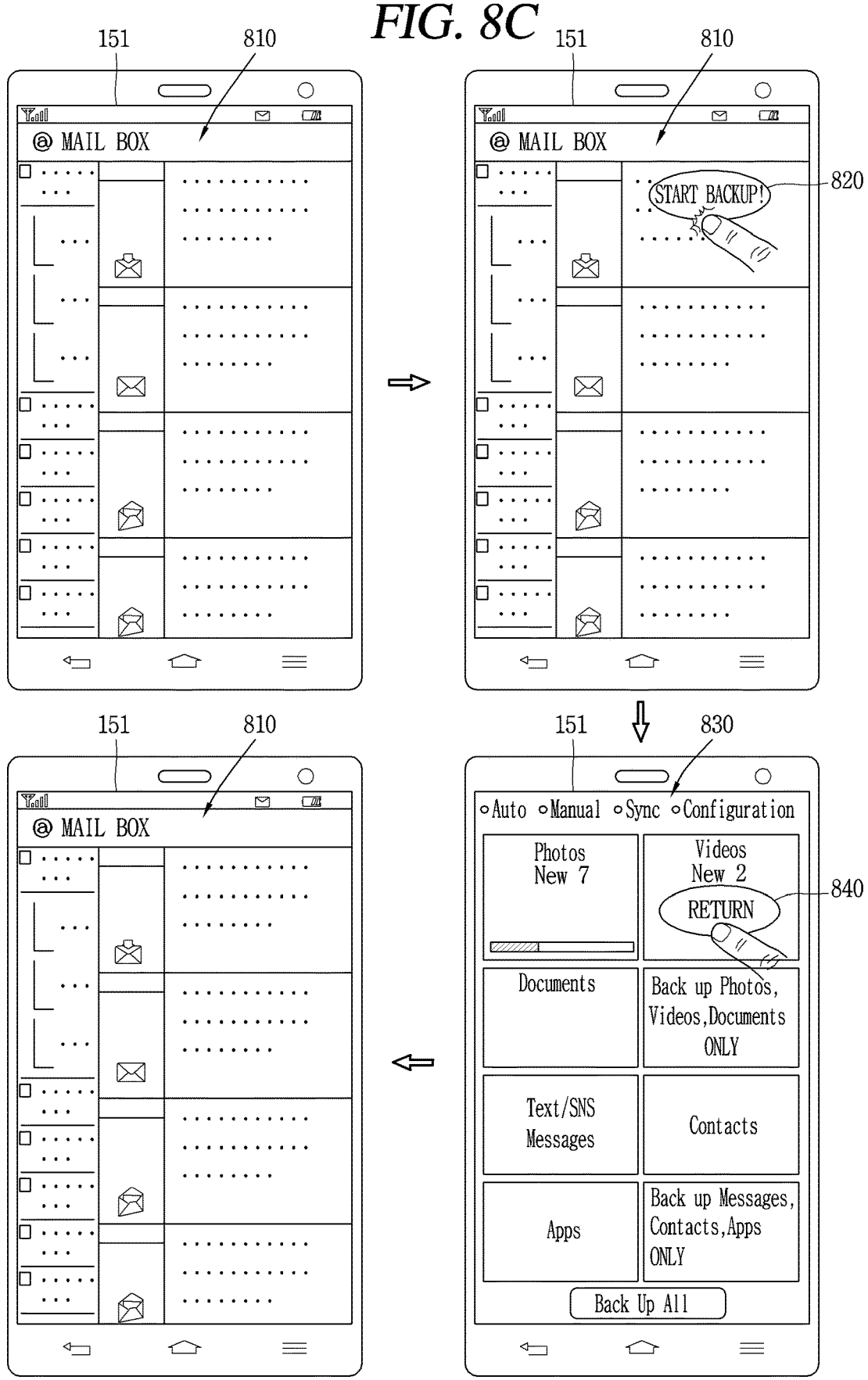

Meanwhile, when the external device 200 capable of performing the backup function is connected while a function different from the backup function is executed, the mobile terminal according to the present invention may provide user convenience such that the currently-executed function can be continuously performed. Hereinafter, this will be described in more detail with reference to the accompanying drawings. FIGS. 8A, 8B and 8C are conceptual views illustrating a relationship between the data backup function and other functions of the mobile terminal according to the present invention.

As described above, the controller 180 of the mobile terminal according to the present invention can operate the backup function-associated application based on a connection of an external device capable of performing the backup function in the wireless or wired manner. Meanwhile, when another application, other than the backup function-associated application, is currently activated or executed on the mobile terminal, the backup function-associated application may be multi-tasked with the currently-executed another application.

In one example, as illustrated in a first drawing of FIG. 8A, an arbitrary application is activated. While screen information 810 related to the arbitrary application is output, when an external device is connected, the controller 180, as illustrated in a second drawing of FIG. 8A, may maintain the output the screen information 810 of the arbitrary application, and output an indicator (or graphic object) 820 related to the backup function on at least part of the screen information 810.

The controller 180 may output a graphic object 820 indicating that the external device has been connected. At this time, the controller 180 may actually perform the backup, in response to a preset touch applied to the graphic object 820. That is, in this case, after outputting information indicating that the external device has been connected, the controller 180 may transmit data stored in the memory 170 to the external device based on a user selection.

The controller 180 may transmit at least part of the data stored in the memory 170 to the external device when a preset touch is applied to the graphic object 820. In this instance, as illustrated in a third drawing of FIG. 8A, the touch screen 151 may continuously output the screen information 810 of the arbitrary application, and indicate the ongoing backup through the graphic object 820.

Here, the preset touch with respect to the graphic object 820 may include be at least one of a short (or tap) touch, a long touch, a multi touch, a drag touch, a flick touch, a pinch-in touch, a pinch-out touch, a swipe touch, and a hovering touch.

The controller 180 may i) perform the backup function while outputting the screen information 810 of the arbitrary application, or ii) switch the screen information 810 of the arbitrary application into screen information related to the backup function, according to a method of applying a touch to the graphic object 820 illustrated in the second drawing of FIG. 8A.

For example, as illustrated in the second drawing of FIG. 8A, when a first type of touch (e.g., a short touch) is applied to the output graphic object 820, the controller 180 may maintain the output of the screen information 810 of the arbitrary application, and execute the backup function-associated application. And, as illustrated in a second drawing of FIG. 8B, when a second type of touch (for example, a long touch) different from the first type is applied to the output graphic object 820, the controller 180 may execute the backup function-associated application and then switch the screen information 810 of the arbitrary application into screen information 830 of the backup function-associated application. At this time, the arbitrary application may not be terminated, but be maintained in the activated or executed state.

On the other hand, as illustrated in a third drawing of FIG. 8C, in the state where the screen information 830 of the backup function-associated application is output, the controller 180 may overlap a graphic object 840 with the screen information 830 of the backup function-associated application, such that the screen information 810 of the arbitrary application can be output again. In this case, when the graphic object 840 overlapped with the screen information 830 of the backup function-associated application is selected (or touched), the controller 180, as illustrated in a fourth drawing of FIG. 8C, may output the screen information 810 of the arbitrary application again on the touch screen 151. Here, the arbitrary application may be screen information related to the last (or most recently) output application on the touch screen 151 before the screen information 830 of the backup function-associated application is output to the touch screen 151.

In addition, although not illustrated, the controller 180 may activate the backup function-associated application when the external device is connected, and overlap a first graphic object, which notifies that the backup function is currently executed, with at least part of the screen information of the arbitrary application output on the touch screen 151. That is, the controller 180 may continuously output the screen information of the arbitrary application even when the external device is connected and thus the backup function is executed. When a preset type of touch is applied to the first graphic object, the controller 180 may switch the screen information of the arbitrary application into the screen information of the backup function-associated application.

Further, in response to the switching from the screen information of the arbitrary application into the screen information of the backup function-associated application, the controller 180 may overlap a second graphic object corresponding to the arbitrary application with at least pat of the screen information of the backup function-associated application.

When the preset type of touch is applied to the second graphic object, the controller 180 may switch the screen information of the backup function-associated application into the screen information of the arbitrary application.

As described above, in the mobile terminal according to the present invention, as screen information is converted, a graphic object can be output to facilitate a restoration to screen information prior to the conversion, thereby enhancing user convenience.

In addition, in the mobile terminal according to the present invention, even when the backup function is executed, an output of screen information which is currently output on a touch screen can be maintained as it is, so that the user can continuously use a currently-used function on the mobile terminal.

Figure 9:
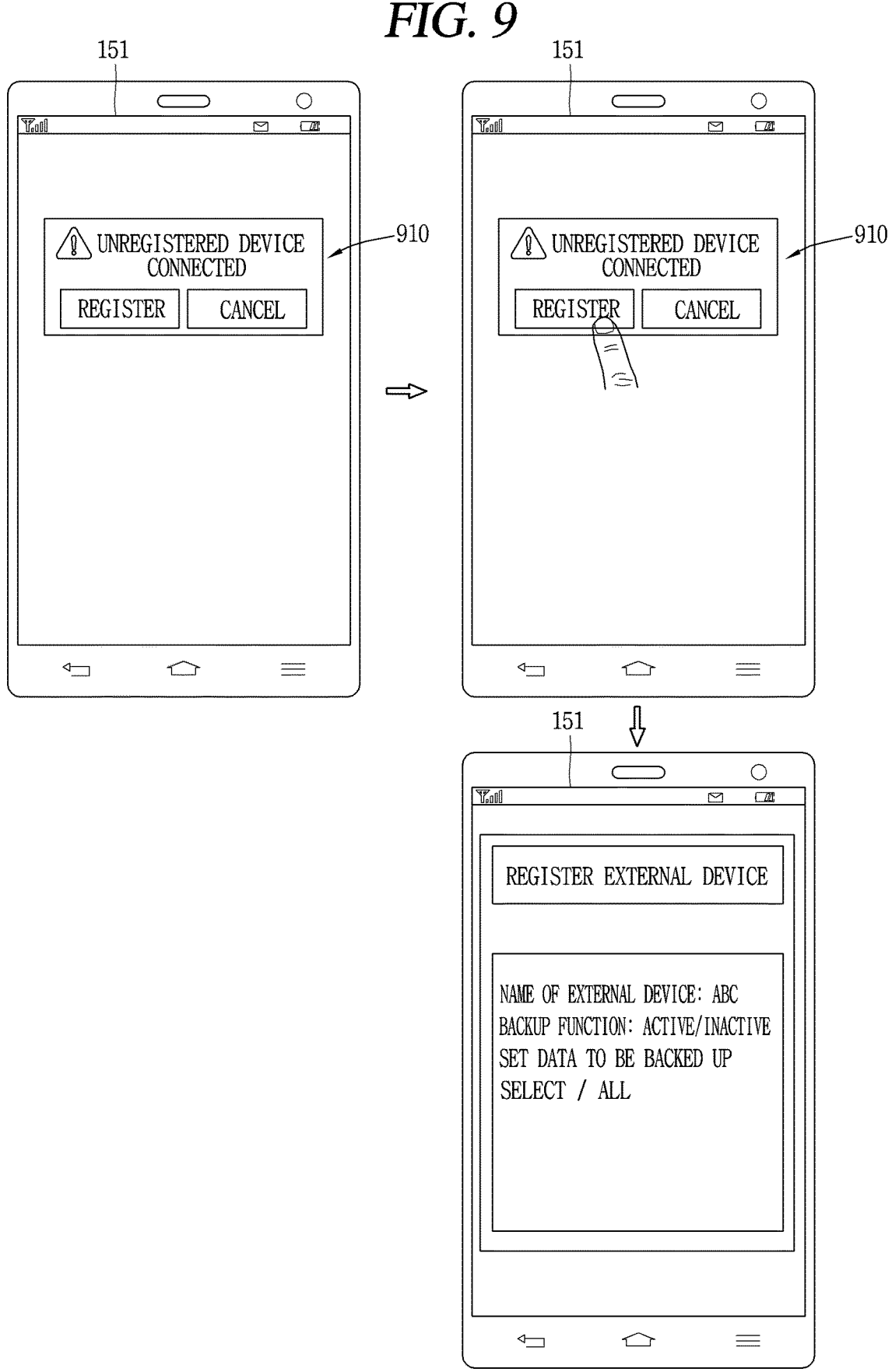
FIG. 9 is a conceptual view illustrating a case where an unregistered external device is connected in association with an execution of a data backup function.

Hereinafter, a method of performing a registration process for a connected device when a unregistered device (or an unauthenticated device) is connected to perform a backup function with the mobile terminal according to the present invention will be described in more detail with reference to the accompanying drawings. FIG. 9 is a conceptual view illustrating a case where an unregistered external device is connected in association with an execution of a data backup function.

As described above, in the mobile terminal according to the present invention, the data backup function may be executed only when the connected external device is a pre-registered external device. That is, according to the present invention, it may be determined using the authentication information related to the external device whether the connected external device is an external device set by the user as a storage space for data to be backed up (i.e., backup target data). When the connected external device is successfully authenticated according to the determination result, the mobile terminal may execute the data backup function with the connected external device.

For example, the controller 180 may execute the backup function when PID information (SSID information, connection security method information or password information) related to the connected external device 200, which is included in the authentication information received from the connected external device 200, corresponds to PID information related to a pre-registered external device. On the other hand, the controller 180 may restrict the execution of the backup function when the PID information (SSID information, connection security method information or password information) related to the connected external device 200 does not correspond to the PID information related to the pre-registered external device.

In addition, when the pre-registered device is not connected, the controller 180 may restrict the execution of the backup function and execute a registration process for the connected external device 200.

That is, when the PID information (or SSID information) related to the external device 200 does not correspond to the authentication information related to a pre-registered external device, the controller 180 may register the external device 200 as a device for performing the backup function with the mobile terminal by using the PID (or SSID) information related to the external device 200 on the basis of a user selection.

For example, as illustrated in FIG. 9, when an unregistered device is connected, screen information 910 indicating that the unregistered device is connected may be output on the touch screen 151. When an execution of a registration process for the unregistered device is selected from the screen information 910 based on a user selection, the controller 180 may execute the registration process for the connected unregistered device (or external device).

During this registration process, options related to the data backup function, such as a type of data to be backed up, whether or not to automatically execute the backup when a device is connected, and the like, may be selected. As described above, according to the mobile terminal according to the present invention, even if an unregistered device is connected, screen information and a registration process can be provided so that the registration process for the device can be performed. This may result in enhancing user convenience.

As described above, the external device 200 and the mobile terminal can execute the backup function after the device registration is completed, or when the external device 200 is re-connected to the mobile terminal 100 after the device registration is completed.

As described above, the present invention can execute the data backup function only when the external device is connected to the interface unit and the connected external device is a pre-registered external device. That is, according to the present invention, it may be possible to determine based on authentication information related to the connected external device whether the connected external device is an external device set by a user as a storage space for data to be backed up. Therefore, according to the present invention, since the data backup function is executed only for the authenticated external device, an information leakage to a third party can be prevented and the user's privacy can be protected.

Furthermore, according to the present invention, even though the data backup function is not separately selected by the user, the data backup function can be automatically executed when a preset external device is connected. Therefore, the user can reduce inconvenience in operating the terminal for selecting the data backup function.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet).

The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for controlling a mobile terminal executing a data backup function with an external device, the method comprising:
   receiving authentication information related to the external device when the external device is connected to an interface unit;
   identifying whether or not the external device is a pre-registered device for executing the data backup function, using the received authentication information; and
   transmitting at least part of data stored in a memory to the external device when the external device is identified as the pre-registered device,
   wherein an application associated with the backup function is activated on the mobile terminal, in response to the external device being connected to the interface unit,
   wherein the application associated with the backup function is multi-tasked with another application, which has been executed on the mobile terminal before the activation of the application associated with the backup function,
   wherein a graphic object notifying that the external device has been connected is output when the external device is connected to the interface unit in a state where screen information related to the another application is output on touch screen,
   wherein the output of the screen information related to the another application is maintained and the application associated with the backup function is executed when a first type of touch is applied to the output graphic object, and
   wherein the application associated with the backup function is executed when a second type of touch, different from the first type, is applied to the output graphic object, and the screen information related to the another application is switched into the screen information regarding the application associated with the backup function.

2. The method of claim 1, wherein the authentication information includes product identification (PID) information related to the external device, and
   wherein the backup function is executed when it is identified through the identifying step that the PID information related to the external device corresponds to PID information related to the pre-registered external device, and
   wherein the execution of the backup function is restricted when the PID information related to the external device does not correspond to the PID information related to the pre-registered external device.

3. The method of claim 2, further comprising registering the external device as a device for executing the backup function with the mobile terminal, using the PID information related to the external device, based on a user selection, when the PID information related to the external device does not correspond to the PID information related to the pre-registered external device.

4. The method of claim 3, further comprising executing the backup function with the external device after the registering step, or when the external device is re-connected to the interface unit after the registering step is completed.

5. The method of claim 1, wherein screen information related to the data backup function is output on a touch screen of the mobile terminal when the data backup function is executed,
- wherein graphic objects corresponding to each type of data are included in the screen information, and
- wherein in the transmitting step to the external device, data of a type corresponding to a graphic object selected by a user from the graphic objects is transmitted to the external device.

6. The method of claim 1, wherein screen information related to the backup function includes graphic objects corresponding to each type of data, and
- wherein in the step of transmitting the at least part of the data stored in the memory to the external device, data of a type corresponding to a graphic object selected by a user from the graphic objects is transmitted to the external device.

7. The method of claim 6, wherein the touch screen of the mobile terminal is divided into a first area including the graphic objects and a second area separate from the first area, and
- wherein the selection of the graphic object is made in response to the graphic object being moved to the second area by a drag touch applied to the graphic object.

8. The method of claim 1, wherein a log file for completely backed-up data among the data stored in the memory is generated when the backup of the data stored in the memory is completed, and
- wherein data to be transmitted to the external device is decided using the log file when the backup function is executed again with the external device after the completion of the backup.

9. The method of claim 8, wherein screen information related to the backup function, output on a touch screen of the mobile terminal, includes graphic objects corresponding to each type of data, and
- wherein the touch screen outputs thereon an indicator indicating a presence of data to be backed up, which is to be transmitted to the external device, in the vicinity of a graphic object corresponding to a type of the data to be backed up, on the basis of the log file.

10. The method of claim 9, wherein only data which has not been transmitted to the external device, among data of the type corresponding to the selected graphic object, is transmitted to the external device based on the log file, when one of the graphic objects is selected.

11. The method of claim 1, wherein the application associated with the backup function is activated when the external device is connected in a state where screen information related to the another application is output on a touch screen of the mobile terminal, and
- wherein at least part of the screen information related to the another application overlaps a first graphic object notifying that the backup function is currently executed.

12. The method of claim 11, wherein the screen information related to the another application is switched to screen information regarding the application associated with the backup function, when a preset type of touch is applied to the first graphic object.

13. The method of claim 12, wherein at least part of the screen information regarding the application associated with the backup function overlaps a second graphic object corresponding to the another application, in response to the screen information related to the another application being switched into the screen information regarding the application associated with the backup function.

14. The method of claim 13, wherein the screen information regarding the application associated with the backup function is switched into the screen information related to the another application, when the preset type of touch is applied to the second graphic object.

15. The method of claim 1, wherein the data transmitted to the external device is decided based on a type of the external device.

* * * * *